Aug. 18, 1931.  W. H. SHAW  1,819,795
GUIDE FOR POWER REVERSE GEAR FLOATING LEVERS
Filed Jan. 11, 1928
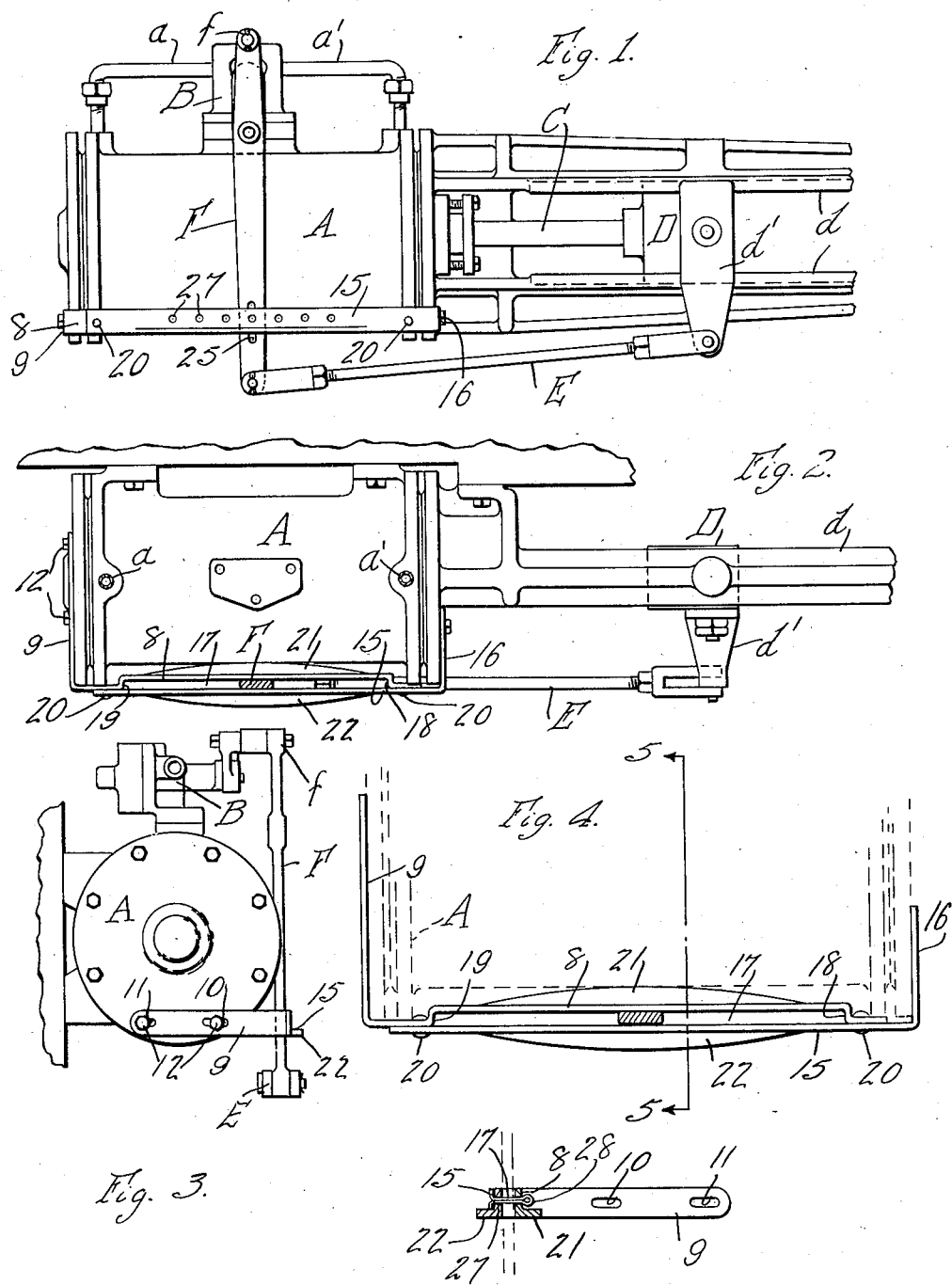
INVENTOR.
William H. Shaw
by Parker & Prochnow
ATTORNEYS.

Patented Aug. 18, 1931

1,819,795

UNITED STATES PATENT OFFICE

WILLIAM H. SHAW, OF SCRANTON, PENNSYLVANIA

GUIDE FOR POWER REVERSE GEAR FLOATING LEVERS

Application filed January 11, 1928. Serial No. 245,938.

This invention relates to guides for the reverse gear floating lever of a locomotive or similar machine.

The usual pneumatically operated reversing mechanism for reversing the main valve gear of a locomotive includes a floating lever which is pivotally mounted at one end on a part of the reversing mechanism and has its other end connected to a pivoted connecting link, so that this floating lever together with a part of the link are supported only by the pivotal connection of the first mentioned end of the lever. Consequently this floating lever is subject to very servere vibrations and jars caused by the locomotive's rolling and swaying while moving over the track and these vibrations become excessive when the locomotive is operating at high speed. These vibrations of the lever subject the pivotal mounting thereof to severe strains, which cause the air valve to leak and cause creeping of the reversing mechanism, resulting in a shifting of the main valve gear of the locomotive and thus seriously interfering with the efficient operation of the same.

The objects of this invention are to provide a guide for the floating lever of a fluid pressure operated reverse gear for the purpose of steadying the floating lever and thus preventing the developing of leaks in the control valve and creeping of the reverse gear; also to provide a guide of this kind of strong and durable construction which can be produced at a low cost and which can readily be applied to the engine; also to provide a guide of this kind with means for securing the floating lever in various positions in the event that the operating connection between the engineer's operating lever and the reverse gear become broken or inoperative; also to improve the construction of devices of this kind in other respects hereinafter specified.

In the accompanying drawings:

Fig. 1 is a side elevation of an air operated reverse gear having applied thereto a floating lever guide embodying this invention.

Fig. 2 is a top plan view thereof.

Fig. 3 is an end elevation thereof.

Fig. 4 is a top plan view, on an enlarged scale, of the floating lever guide.

Fig. 5 is a sectional view thereof on line 5—5, Fig. 4.

The reverse gear or mechanism illustrated in the accompanying drawings is of a kind that is commonly employed on locomotives and is herein illustrated only for the purpose of showing the application of my invention thereto and is not by itself a part of my invention. A reverse gear of any other type in which a floating lever is employed may be used, if desired. The particular reverse gear shown includes a cylinder A, the opposite ends of which communicate with air conduits or passages $a$ and $a'$, which connect with a valve chamber B. The cylinder contains a piston (not shown) to which is secured a piston rod C connected with a cross head D movable lengthwise in guides $d$. The cross head is provided with an extension $d'$ to the lower end of which one end of a link E is pivoted, the other end of this link being pivotally connected to the lower end of a floating lever F. The opposite end of this lever F is connected at $f$ with the valve (not shown) in the chamber B. Consequently it will be noted that the entire weight of the floating lever F, together with the portion of the link E, is suspended from the upper supporting connection $f$ of the floating lever. Thus the swaying and rolling of the engine along the track at high speed subjects this floating lever to severe vibrations which are transmitted at increased leverage to the air valve in the chamber B, so that these lateral vibrations of the lever result in a constant tendency to unseat the operating valve to which the floating lever connects, which valve controls the air supply leading to both ends of the cylinder. This valve seating and unseating by these periodic vibrations of the floating lever causes rapid wear in the valve itself and also causes what is ordinarily termed "creeping" of the reverse gear, which causes shifting of the cutoff positions of the valve gear. This is not only disturbing to the engineer, but also interferes with the proper functioning of the reverse gear and in some cases causes damage to both the reverse gear and the valve gear of the locomotive, which in turn causes fuel losses and makes it impossible for the engineer to maintain his schedule.

In order to prevent the vibrations of the floating lever F and the damages resulting therefrom, I have provided a guide which co-operates with the lower portion of the floating lever and which is provided with a longitudinal slot which permits the movement of the lever lengthwise of the power reverse cylinder A and which prevents movement of the floating lever in other directions. This guide may be of any suitable or desired construction, that shown in the accompanying drawings consisting of a detachable construction including two members secured together to form between them a slot for the guidance of the floating lever F. One of these members includes a longitudinal part 8 terminating at one end thereof in an arm 9, which is provided with apertures 10 and 11 which are preferably in the form of slots and through which bolts 12 on one end or head of the cylinder A may extend. The other member of the guide is provided with a longitudinal portion 15 and an arm 16 adapted to be secured to the other head or end of the cylinder in the same manner as the arm 9 is secured to the first mentioned head or end. The portions 8 and 15 of the two members of the guide are suitably spaced apart to form between them a slot 17 for guiding the floating lever F and any suitable means may be provided for spacing apart the members of the guide to form the slot. In the construction shown the longitudinal portion 8 of one of the members of the guide is provided with offsets or shoulders 18 and 19 near the opposite ends thereof by means of which the desired spacing to form the slot 17 is effected. The two members of the guide are secured together beyond the shouldered portions 18 and 19 in any suitable or desired manner, fastening devices such as rivets 20 being illustrated by way of example in the drawings. These fastening devices not only secure the two members of the guides together but also serve to position the angular extensions or arms 9 and 16 of the guide relatively to each other. It will be obvious that other means for mounting the guide on the reverse gear may be employed, if desired.

Each of the longitudinal portions 8 and 15 of the two members of the guide are preferably provided with reinforcing or stiffening flanges 21 and 22 respectively, which serve to prevent flexing of the longitudinally extending portions of the guide due to shocks to which the floating lever F is subjected. These flanges may be provided for in any suitable or desired manner, those shown being formed integral with the longitudinally extending parts of the guide and enable these parts to hold the lever against oscillating in axial planes of its pivot. The slot 17 extends lengthwise of the direction of movement of the floating lever about its pivot.

The floating lever guide may also be used in connection with the floating lever for locking this lever in any desired position in the event that the usual operating connection between the operating lever or device in the engineer's cab and the reverse gear becomes broken or inoperative. In such a case the floating lever F may be moved manually into the desired position and then locked in such position by any suitable means, so that the engine can continue to operate. Any suitable means may be provided for locking the floating lever F in the desired position and in the particular construction shown for this purpose the lever is provided with a slot 25 and the guide is provided with a plurality of apertures 27, Figs. 1 and 5, extending through the parts 8 and 15 thereof. A pin or bolt of any suitable kind such, for example, as a cotter pin 28, Fig. 5, may then be inserted through any one of the holes 27 and through the slot 25 in the lever F to secure the lever in the desired position. When the pin 28 is removed the floating lever F may be actuated in the usual manner, it being understood that the pin and the locking arrangement are not intended to be used except in case of emergency.

The guide shown and described is of simple and inexpensive construction and can readily be applied to the power reverse cylinder of a pneumatically operated reverse gear and requires no changes whatever on the cylinder or on any parts of the reverse gear and requires no changes whatever on the cylinder or on any parts of the reverse gear since the guide can be applied to the cylinder by simply passing two of the bolts of each cylinder head or end through the apertures in the arms of the lever guide. The guide described also has the further advantage that in case of emergency the floating lever can be pinned or locked to its guide and thus secured in any desired position, so that the engineer can move his train to its destination by the usual throttle manipulation.

I claim as my invention:—

1. In a locomotive power reverse gear of the type having a cylinder and floating lever pivotally supported near one end above said cylinder and having its other end unsupported against side sway, the combination of a guide including two parts arranged approximately in contact with opposite sides of said floating lever and extending parallel to the direction of movement thereof and between which said floating lever may swing about its pivot, means for securing said guide to a fixed part of said reverse gear, and a connecting member adapted to be rigidly secured to said guide and to engage said lever for holding said lever fixed against movement in said guide.

2. A guide for a floating lever of a locomotive power reverse gear including a cylinder having its ends secured thereto by bolts, said guide including a pair of guide bars, one of said guide bars having a part extending parallel to the path of movement of said lever at one side of said lever and having a laterally extending portion to be secured to one end of said cylinder, the other of said guide bars having a corresponding portion arranged parallel to the path of movement of said lever at the opposite side of said lever and having a part extending laterally to said guide portion to a position to be secured to the other end of said cylinder, means for securing said two guide portions of said guide bars in spaced relation to form between them a guide slot for said lever, apertures in said lateral extensions of said guide bars through which said cylinder bolts may pass for securing said guide bars to said cylinder, said guide portions of said bars and said lever being provided with apertures, and means extending through apertures of said bars and said lever for locking said lever in fixed relation to said guide.

WILLIAM H. SHAW.